Dec. 18, 1928.

A. A. PONSONBY 1,695,856

CONTROL SYSTEM

Filed Feb. 21, 1927

WITNESSES:
G. S. Neilson
E. W. Savage

INVENTOR
Amos A. Ponsonby
BY
Wesley G. Carr
ATTORNEY

Patented Dec. 18, 1928.

1,695,856

UNITED STATES PATENT OFFICE.

AMOS ALBERT PONSONBY, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed February 21, 1927. Serial No. 169,964.

This invention relates to motor-control systems and primarily to control systems for use on motor-driven vehicles, such as mine cars and the like.

The object of the invention, generally stated, is the provision of a control system for motor-driven vehicles that shall be simple and efficient in operation and readily and economically manufactured.

A more specific object of the invention is to provide for opening the control circuits of a motor-control system utilized for controlling a motor-driven vehicle, when the operator leaves the control station.

It is also an object of the invention to provide a control system for a motor, which requires that the controller drum be moved to its "off" position before control circuits that have been interrupted may be re-established.

Other objects of the invention will, in part, be obvious, and will, in part, appear hereinafter.

The invention is disclosed in the embodiment thereof shown in the accompanying drawing and comprises the features of construction, combination of elements, and arrangement of parts that will be exemplified in the construction hereinafter set forth and the scope of the application of which will be indicated in the claims.

Figure 1:
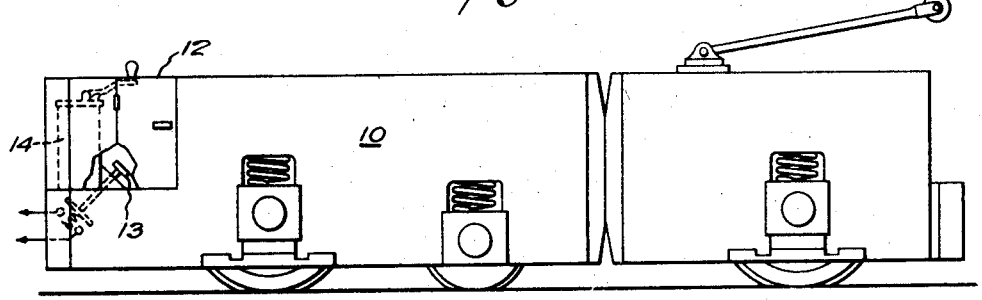
Figure 2:
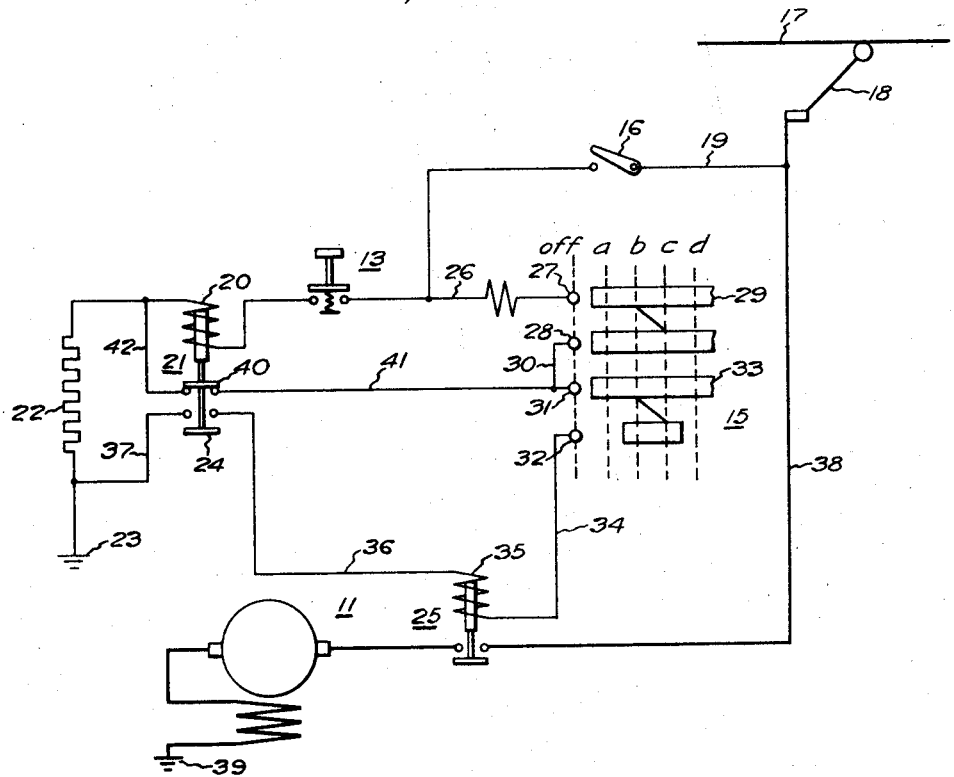

For a fuller understanding of the nature and objects of the invention, reference should be had to the following detailed description, taken in connection with the accompanying drawing, in which, Fig. 1 is a view, in side elevation, of a mine car equipped with a safety attachment which constitutes the subject matter of this invention, and Fig. 2 is a diagram of the circuit connections of a control system arranged in accordance with this invention.

Referring now to the drawing, 10 designates, generally, a mine car of any well-known construction which may be operated by means of a motor of any suitable type, such, for example, as the series motor 11 shown in Fig. 2. In vehicles of this type, a cab, such as illustrated at 12, is provided for the operator.

It often happens, in the operation of vehicles of this type, that the power fails and the vehicle is brought to a stop with the controller set in its "on" position. Under such conditions, the operator may be required to leave the vehicle in order to make an inspection of the power system or repairs, and, if he is negligent, he may leave the vehicle with the controller set in its "on" position. Accordingly, if the power supply is suddenly re-established, there is a possibility that the vehicle may be set in operation to move along the track without an operator.

In order to prevent the possibility of starting a vehicle of this type upon the re-establishment of the power supply and when the operator is not in his cab, a safety switch 13 is provided. In this particular embodiment of the invention, a foot-operated switch is disposed in the cab in some position which requires the operator to be located at his post before he can actuate it.

The operation of the safety switch will be understood from the following description of the operation of the motor 11. Assuming that it is desired to operate the vehicle 10 and that the operator has closed the safety switch 13 and actuated the controller 14 to advance the controller drum 15 to position b, it will be understood that the manually operable switch 16 will be closed when the vehicle is put in service and will remain closed until the vehicle is returned to the car shed or some other place for parking.

Upon the closure of the switch 13, current flows from the trolley conductor 17, through the trolley pole 18, conductor 19, switch 13, the actuating coil 20 of the relay 21, and resistor 22, to the ground at 23. Therefore, upon the closure of the safety switch 13, the actuating circuit for the relay 21 is closed and the contact member 24, carried by the relay, is actuated to close the actuating circuit of the line switch 25.

As will be observed, the actuating circuit for the line switch 25 extends from the trolley conductor 17 through trolley pole 18, conductor 19, switch 16, conductor 26, contact fingers 27 and 28, bridged by the contact segment 29 of the controller drum 15, shunt 30, contact fingers 31 and 32, bridged by the contact segment 33, conductor 34, the actuating coil 35 of the line switch 25, conductor 36, contact plate 24, carried by the relay 21, and conductor 37, to the ground at 23. In this manner, the motor circuit is closed, and current flows from the trolley pole 18, through conductor 38, switch 25 and the armature and field of the series motor 11, to the ground at 39.

Assuming now that, for any reason, the power supply through the trolley conductor 17 fails, that the controller drum 15 is standing in position b and that the operator dismounts from the cab 12, the switch 13, which is normally biased to its open position, functions to interrupt the actuating circuit of the relay 21. Further, the relay 21 drops to its open position, breaking the actuating circuit of the line switch 25.

When the relay 21 drops to its lowermost position, the contact plate 40 is actuated to close a shunt circuit across the switch 13 and the actuating coil 20 of the relay 21. A circuit is thereby established from the energized contact segment 33, through contact finger 31, conductor 41, contact plate 40, carried by the relay 21, conductor 42, and the resistor 22, to the ground at 23.

Assume now, that the operator takes his position in the cab and closes the switch 13, since the drum 15 is in position b, the actuating coil 20 of the relay 21 is connected in parallel with the shunt circuit hereinbefore traced, and the current, which flows in the re-established relay actuating circuit, will be insufficient to effect the operation of the relay. Therefore, until the drum 15 is returned to its "off" position to open the shunt circuit, it will be impossible to effect the operation of the relay 21.

It will also be noted that the switch 13 is disposed in an inaccessible place so that it is difficult for any one, except the operator seated in his cab, to actuate it. Thus, there is no danger of the vehicle being set in operation unless the operator is at his post.

Since certain changes may be made in the above construction, and different embodiments of the invention may be made without departing from the scope thereof, it is intended that all matter contained in the above description or shown in the accompanying drawing shall be interpreted as illustrative and not in a limiting sense.

I claim as my invention:

1. In a control system for a vehicle provided with a propelling motor, in combination, a line switch for controlling the operation of the motor, a line-switch-actuating circuit for operating the line switch, a drum for controlling the energization of the line-switch-actuating circuit, a relay disposed for interrupting the line-switch-actuating circuit, an actuating circuit for the relay, a safety switch for controlling the relay-actuating circuit, and a shunt connected to prevent the energization of the relay-actuating circuit by the closure of the safety switch when the drum is in an active position.

2. In a control system for a vehicle provided with a propelling motor, in combination, a line switch for controlling the operation of the motor, a line-switch-actuating circuit including a drum and a relay, an actuating circuit for the relay, a safety switch normally biased toward an open position for controlling the relay-actuating circuit, and a shunt controlled by the relay for preventing the energization of the relay to close the line-switch-actuating circuit upon the operation of the safety switch when the drum is in an active position.

3. In a control system for a vehicle provided with a propelling motor, in combination, a line switch for controlling the operation of the motor, a line switch actuating circuit, a relay provided with an actuating coil for controlling the line switch circuit, a safety switch for controlling the operation of the relay, means for establishing a circuit to shunt the actuating coil of the relay and the safety switch to prevent the operation of the relay in response to the closure of the safety switch, and means for interrupting the shunt circuit to permit the operation of the relay upon the closure of the safety switch.

4. In a control system for a vehicle provided with a propelling motor, in combination, a controller for the motor, a line switch for controlling the operation of the motor, a relay provided with an actuating coil for controlling the line switch circuit, a safety switch for controlling the operation of the relay and means co-operative with the controller to establish a circuit to shunt the actuating coil of the relay and the safety switch to prevent the operation of the relay in response to the closure of the safety switch, said controller being disposed to interrupt the shunt circuit when thrown to its off position to permit the operation of the relay upon the closure of the safety switch.

In testimony whereof, I have hereunto subscribed my name this 16th day of February, 1927.

AMOS ALBERT PONSONBY.